United States Patent
Lindenberg et al.

(10) Patent No.: US 12,415,447 B2
(45) Date of Patent: Sep. 16, 2025

(54) FOLDABLE VEHICLE SEAT

(71) Applicant: FAURECIA Sièges d'Automobile, Nanterre (FR)

(72) Inventors: Uwe Lindenberg, Stadthagen (DE); David Epaud, Lardy (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 551 days.

(21) Appl. No.: 17/738,473

(22) Filed: May 6, 2022

(65) Prior Publication Data

US 2022/0363170 A1   Nov. 17, 2022

(30) Foreign Application Priority Data

May 11, 2021   (FR) ...................................... 2104999

(51) Int. Cl.
*B60N 2/30* (2006.01)
*B60N 2/04* (2006.01)
*B60N 2/12* (2006.01)

(52) U.S. Cl.
CPC .............. *B60N 2/30* (2013.01); *B60N 2/045* (2013.01); *B60N 2/12* (2013.01); *B60N 2/309* (2013.01)

(58) Field of Classification Search
CPC . B60N 2/045; B60N 2/10; B60N 2/14; B60N 2/20; B60N 2/309; B60N 2002/0216
USPC ..................... 296/65.01, 65.05, 65.09, 65.16
See application file for complete search history.

(56) References Cited

U.S. PATENT DOCUMENTS

| | | | |
|---|---|---|---|
| 10,549,670 B1 * | 2/2020 | Smith ..................... | B60N 2/938 |
| 11,040,641 B2 * | 6/2021 | Epaud .................... | B60N 2/206 |
| 11,390,196 B2 * | 7/2022 | Epaud ..................... | B60N 2/12 |
| 2006/0033373 A1 * | 2/2006 | Kammerer ........... | B60N 2/3031 |
| | | | 297/378.1 |
| 2011/0037304 A1 * | 2/2011 | Kammerer ............... | B60N 2/12 |
| | | | 297/340 |
| 2019/0091191 A1 * | 3/2019 | Nilsson ................ | A61K 9/2077 |
| 2020/0101869 A1 * | 4/2020 | Bouzid .................. | B60N 2/309 |
| 2021/0094452 A1 | 4/2021 | Epaud | |

FOREIGN PATENT DOCUMENTS

| | | |
|---|---|---|
| DE | 102005022985 | 5/2006 |
| DE | 102005048608 | 4/2007 |
| DE | 102016205727 | 10/2017 |
| FR | 2898554 | 9/2007 |
| FR | 2929179 | 10/2009 |

OTHER PUBLICATIONS

German Office Action for German App. No. DE 10 2022 111 108.3 dated Sep. 30, 2022, No English Translation, 7 pages.

* cited by examiner

*Primary Examiner* — Jason S Daniels
(74) *Attorney, Agent, or Firm* — Barnes & Thornburg LLP

(57) ABSTRACT

A vehicle seat comprises an underframe; a backrest with a backrest frame; and a flange on each side of the backrest. Each flange is mounted so as to pivot relative to the backrest frame about a first transverse axis, and relative to the underframe about a second transverse axis.

20 Claims, 10 Drawing Sheets

FOLDABLE VEHICLE SEAT

PRIORITY CLAIM

Figure 1:
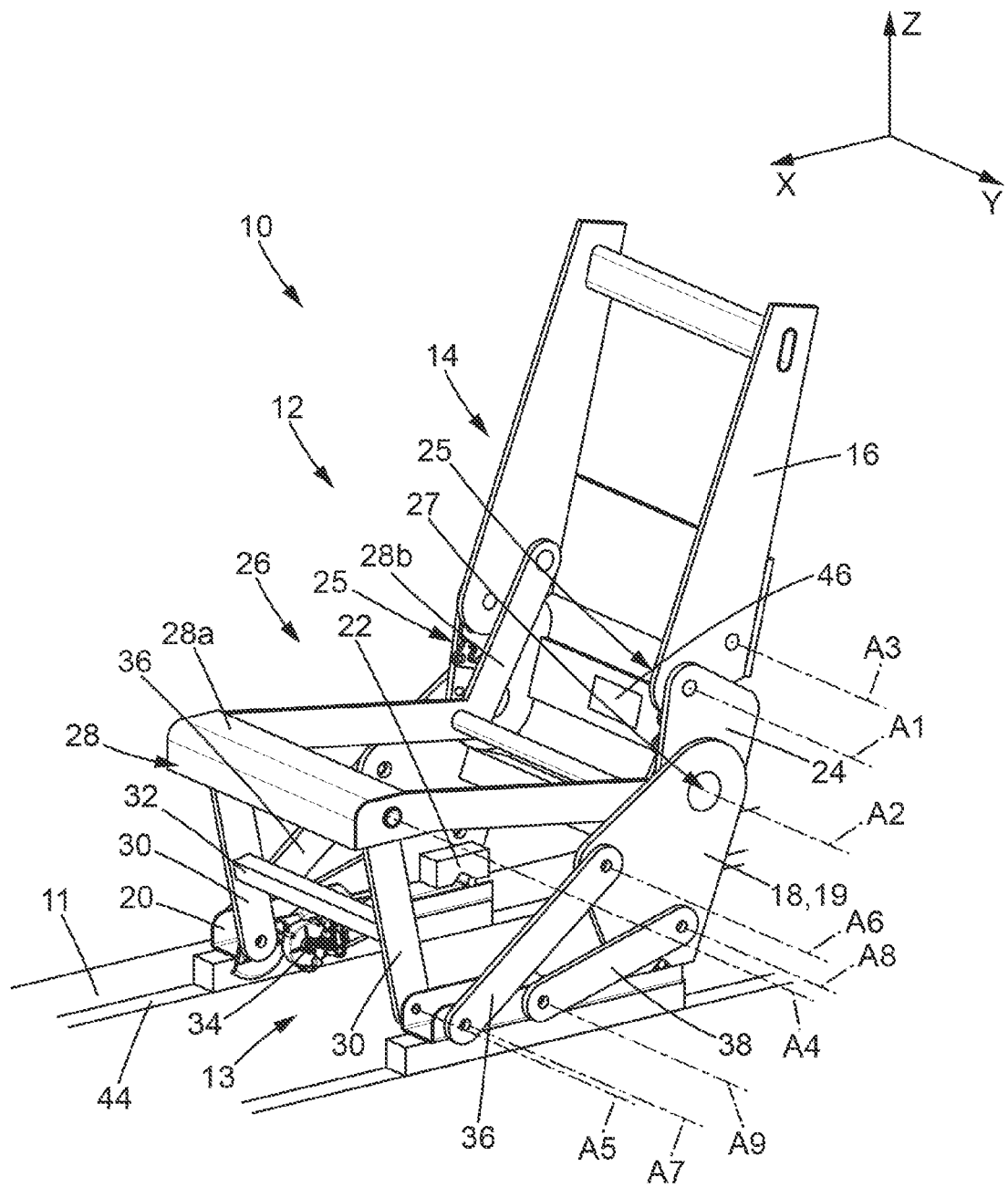

This application claims priority to French Patent Application No. FR2104999, filed May 11, 2021, which is expressly incorporated by reference herein.

BACKGROUND

The present disclosure relates to the field of foldable vehicle seats, in particular motor vehicle seats. This disclosure also relates to a seat assembly comprising such a vehicle seat and to a vehicle, in particular a motor vehicle, comprising such a seat assembly. Lastly, this disclosure relates to methods for making use of such a vehicle seat.

SUMMARY

According to the present disclosure, a motor vehicle seat, comprises an underframe; a backrest with a backrest frame; a flange on each side of the backrest, each flange being mounted so as to pivot relative to the backrest frame about a first transverse axis, and relative to the underframe about a second transverse axis.

In illustrative embodiments, the seat backrest can be folded to two different heights. The folded backrest can thus be used in particular as a table, in a first folded position. A second folded position can correspond to what is called a "flat floor" position.

In illustrative embodiments, the vehicle seat comprises one or more of the following features, alone or in combination:
- the vehicle seat further comprises a seat base with a seat base frame, the seat base frame being mounted so as to pivot relative to the backrest frame about a third transverse axis, the seat base frame preferably having an "L" shape;
- the vehicle seat further comprises a first connecting rod, preferably two first connecting rods arranged one on each side of the seat, in order to connect the seat base frame to a seat support, each first connecting rod being mounted so as to pivot relative to the seat base frame about a fourth transverse axis, each first connecting rod further being intended to be mounted so as to pivot relative to the seat support about a fifth transverse axis;
- the vehicle seat further comprises an actuator for controlling the pivoting of each first connecting rod about the fifth transverse axis;
- the vehicle seat comprises a first tilt adjustment device for adjusting the tilt of the backrest frame relative to the flanges about the first transverse axis, and a second tilt adjustment device for adjusting the tilt of the flanges relative to the underframe about the second transverse axis, at least one among the first and second tilt adjustment devices being capable of being disengaged, the first and second tilt adjustment devices preferably both being capable of being disengaged;
- each among the first and second tilt adjustment devices is a continuous or discontinuous hinge, able to be disengaged;
- the seat further comprises a single actuating device, suitable for selectively controlling the disengagement of one among the first and second hinges;
- the vehicle seat further comprises second and preferably third connecting rods, more preferably two second and two third connecting rods, each arranged one on each side of the seat,
- each second connecting rod being mounted so as to pivot relative to the underframe about a sixth transverse axis, and intended to be mounted so as to pivot relative to a seat support about a seventh transverse axis,
- each third connecting rod being mounted so as to pivot relative to the underframe about an eighth transverse axis, and intended to be mounted so as to pivot relative to the seat support about a ninth transverse axis,
- such that a rotation of the second and/or third connecting rods causes a rear end of the seat, in particular of the underframe, to rise relative to a front end of the seat;
- the underframe is intended to be mounted so as to pivot relative to the seat support about a tenth transverse axis; and
- the vehicle seat further comprises a lock intended for locking/unlocking the underframe to/from the seat support.

In illustrative embodiments, a vehicle seat assembly is described comprising a seat support and a seat as described above, in all its combinations, fixed to the seat support, the seat support preferably being formed by one, or more preferably several, movable rails of a slide mechanism.

In illustrative embodiments, a motor vehicle is described comprising a chassis defining a passenger compartment with a floor, and a vehicle seat assembly as described above, in all its combinations, the vehicle seat support being fixed to the floor of the passenger compartment or being formed by the floor.

In illustrative embodiments, a method is described for folding a vehicle seat as described above, in all its combinations, in particular comprised in a seat assembly as described above, in all its combinations, or in a motor vehicle as described above, in all its combinations, from a deployed position enabling it to receive an occupant of the seat, to a first folded position, comprising the steps of:
  i) where appropriate, disengaging the first tilt adjustment device, preferably by operating the actuation device, where appropriate; and
  ii) folding down the backrest frame to face the seat base frame, by pivoting the backrest frame relative to the flanges about the first transverse axis,
step ii) preferably being implemented by controlling the pivoting of each first connecting rod about the fifth transverse axis, where appropriate.

In illustrative embodiments, a method is described for folding a vehicle seat as described above, in all its combinations, in particular comprised in a seat assembly as described above, in all its combinations, or in a motor vehicle as described above, in all its combinations, from a deployed position enabling it to receive an occupant of the seat, to a second folded position, comprising the steps of:
  i) where appropriate, disengaging the second tilt adjustment device, preferably by operating the actuation device, where appropriate; and
  ii) folding down the backrest frame to face the seat base frame, by pivoting the backrest frame and the flanges relative to the underframe, about the second transverse axis,
step ii) preferably being implemented by controlling the pivoting of each first connecting rod about the fifth transverse axis, where appropriate.

In illustrative embodiments, a method is described for transitioning a vehicle seat as described above, in all its combinations, in particular comprised in a seat assembly as described above, in all its combinations, or a motor vehicle as described above, in all its combinations, from a deployed position enabling it to receive an occupant of the seat, to an easy entry position facilitating access to seating located behind the seat, the method comprising the steps of:

i) where appropriate, unlocking the lock; and (ii) raising the rear of the seat relative to the front of the seat, step ii) preferably being implemented by controlling the pivoting of each first connecting rod about the fifth transverse axis, where appropriate.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
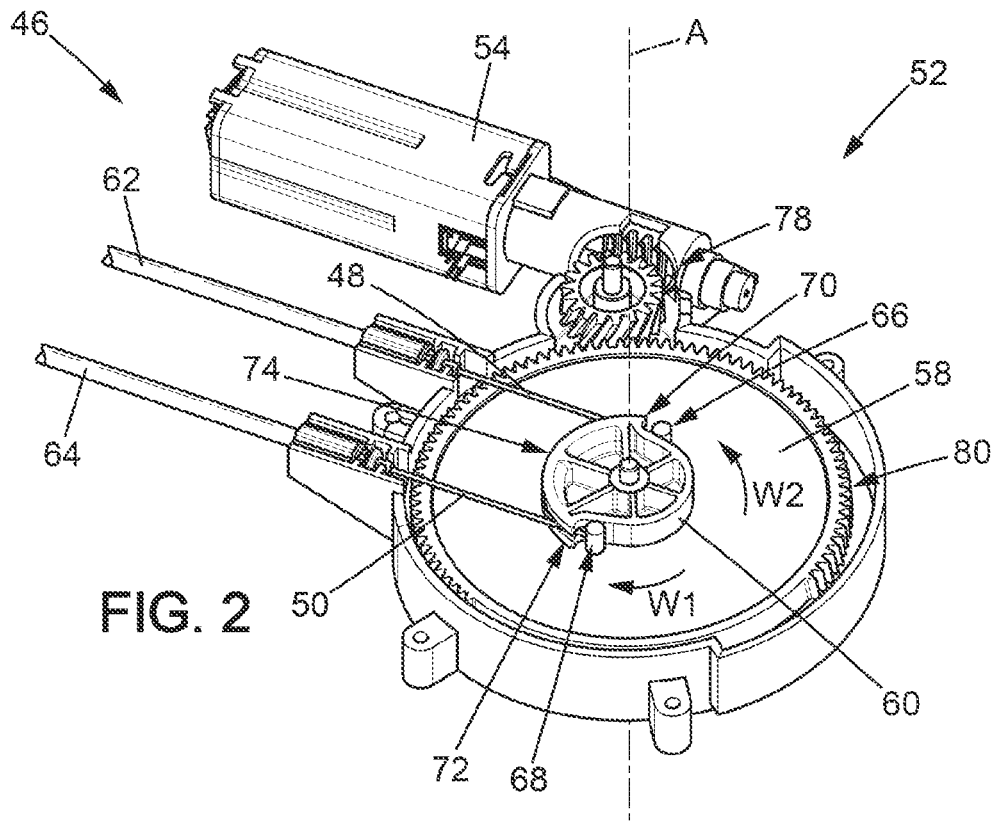
Figure 3:
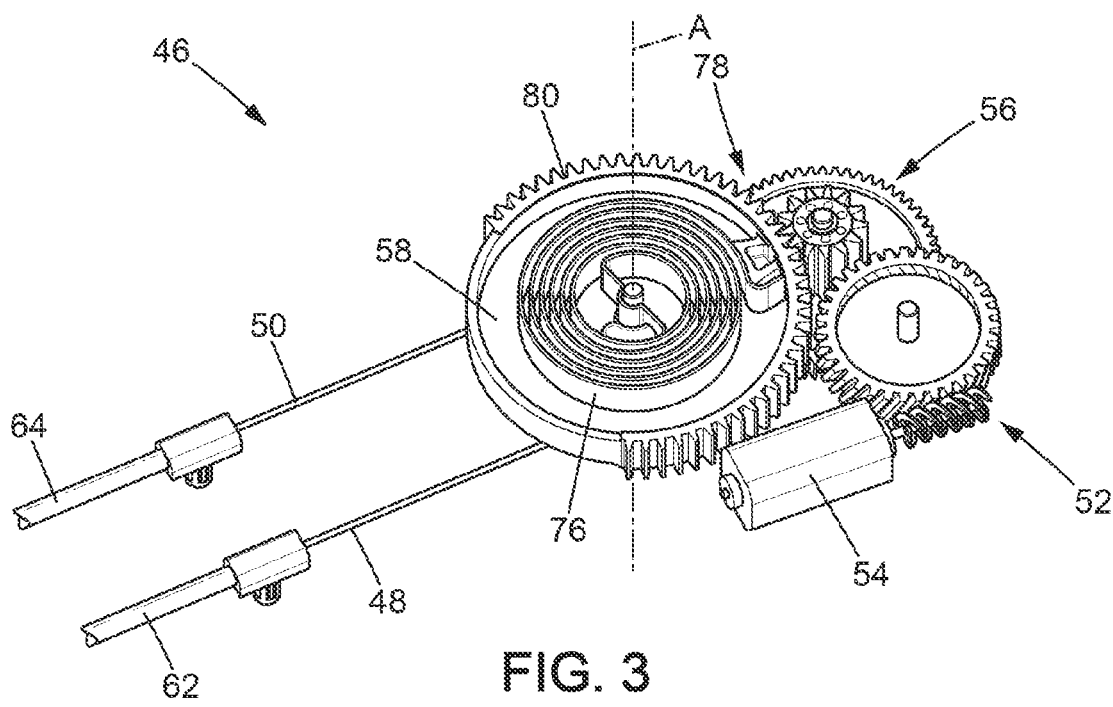
Figure 4:
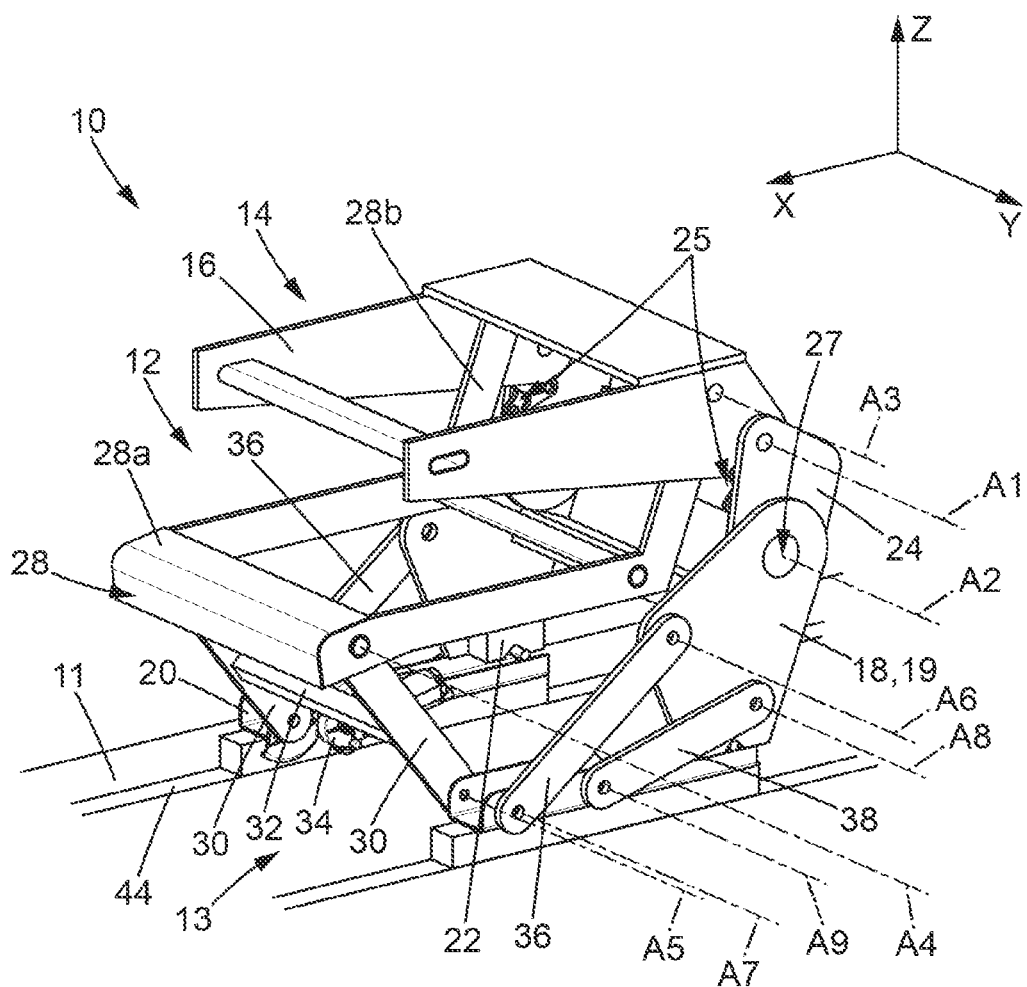
Figure 5:
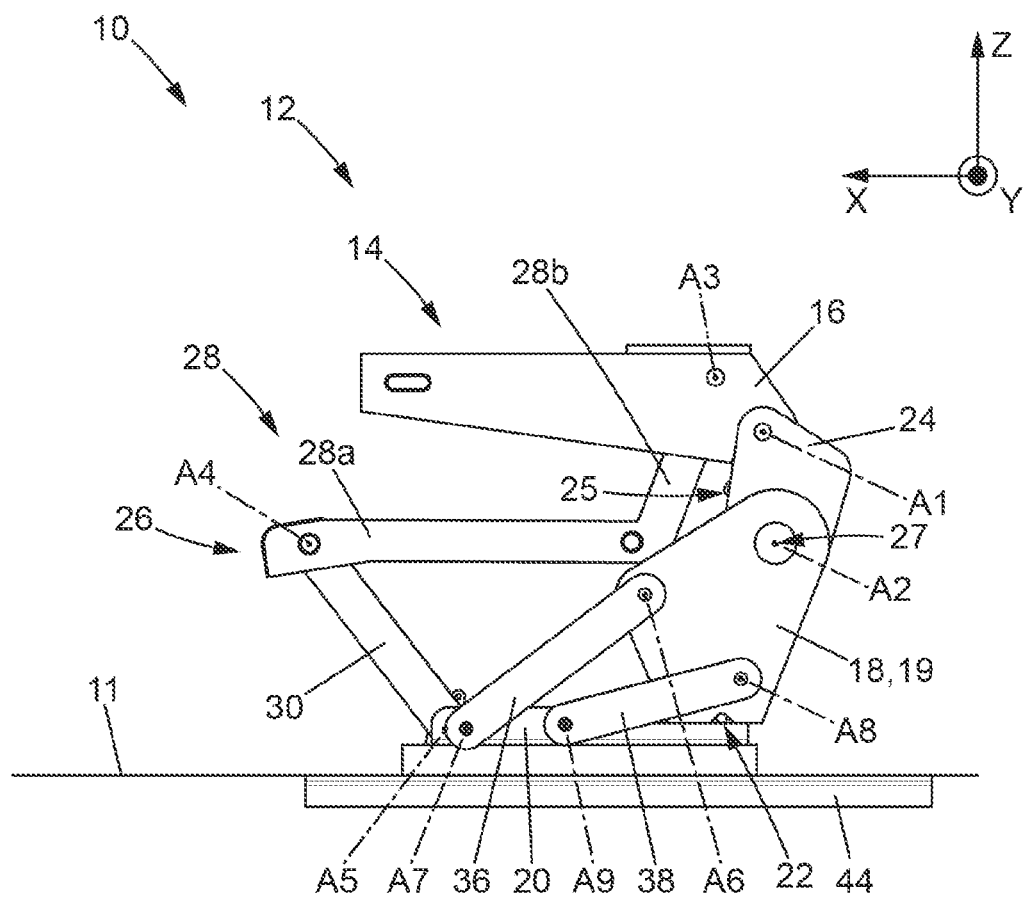
Figure 6:
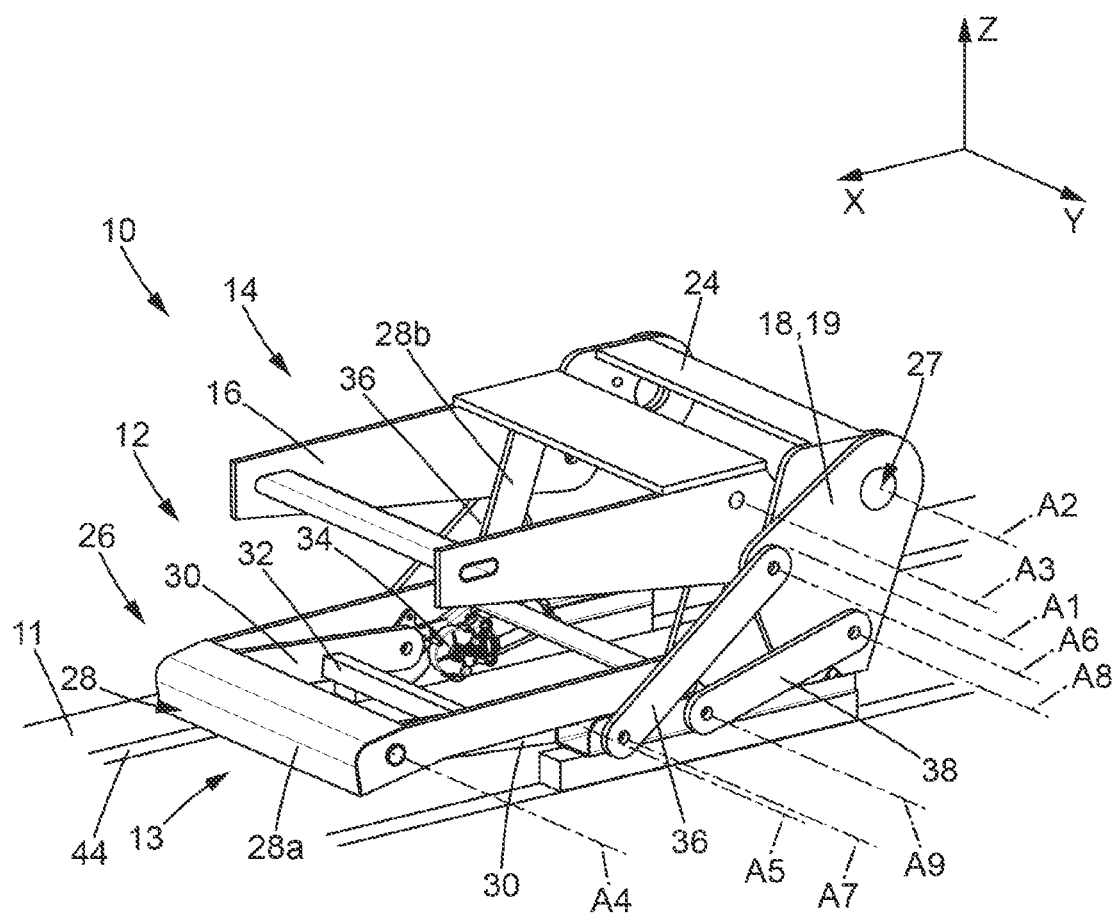
Figure 7:
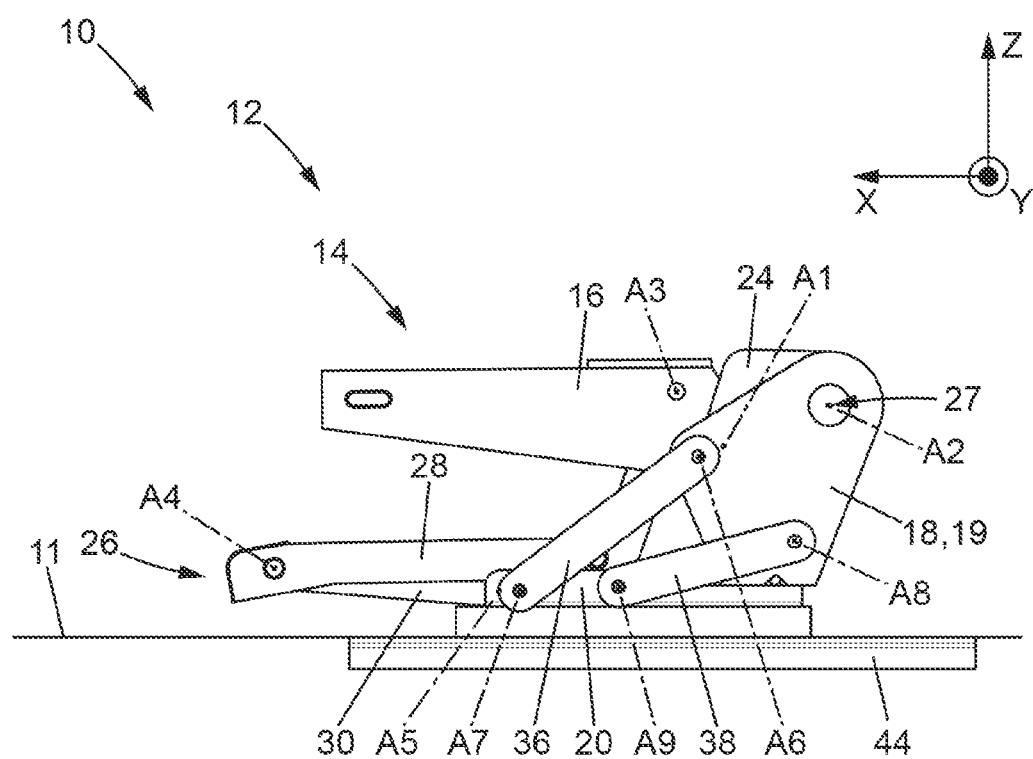
Figure 8:
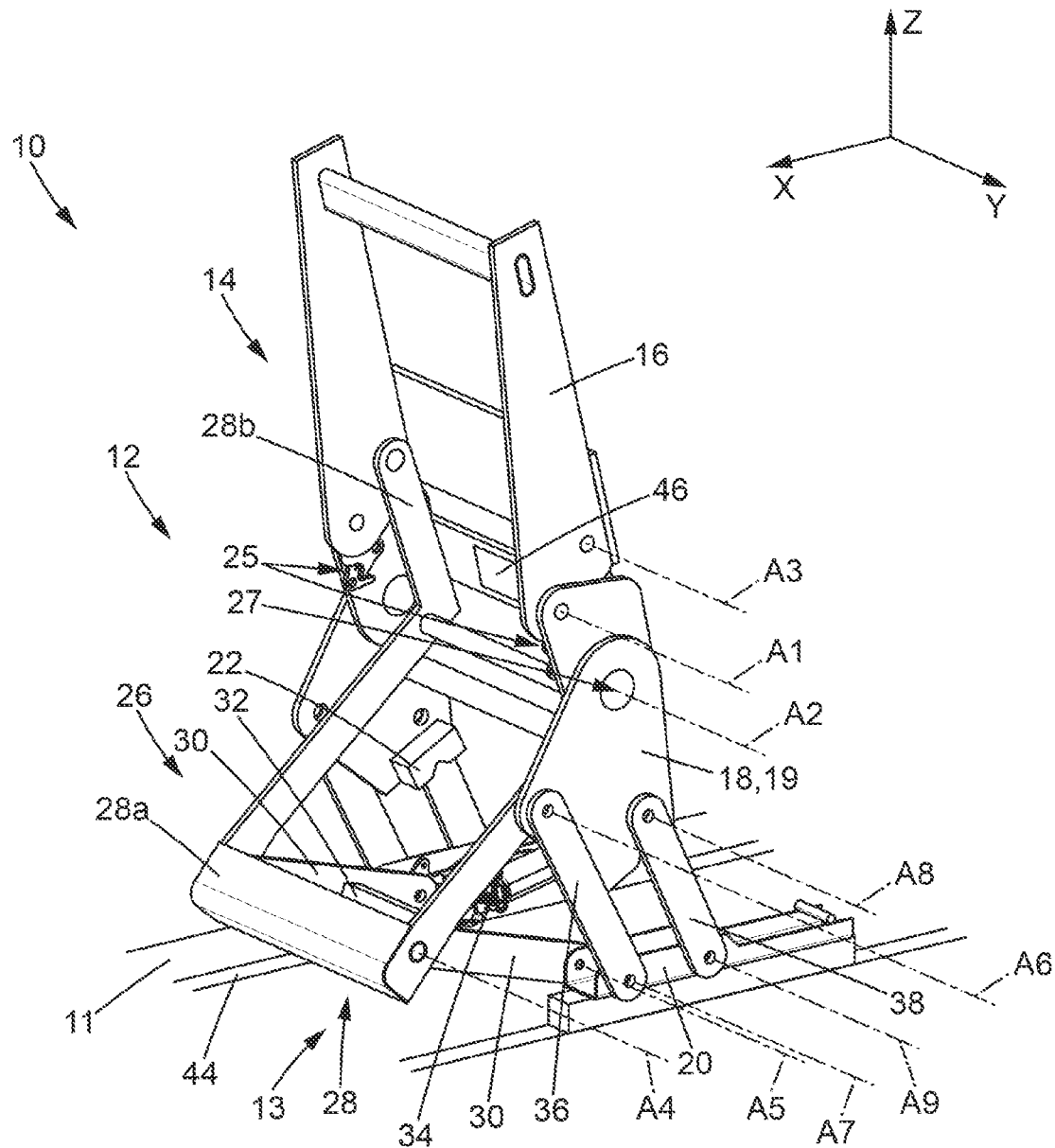
Figure 9:
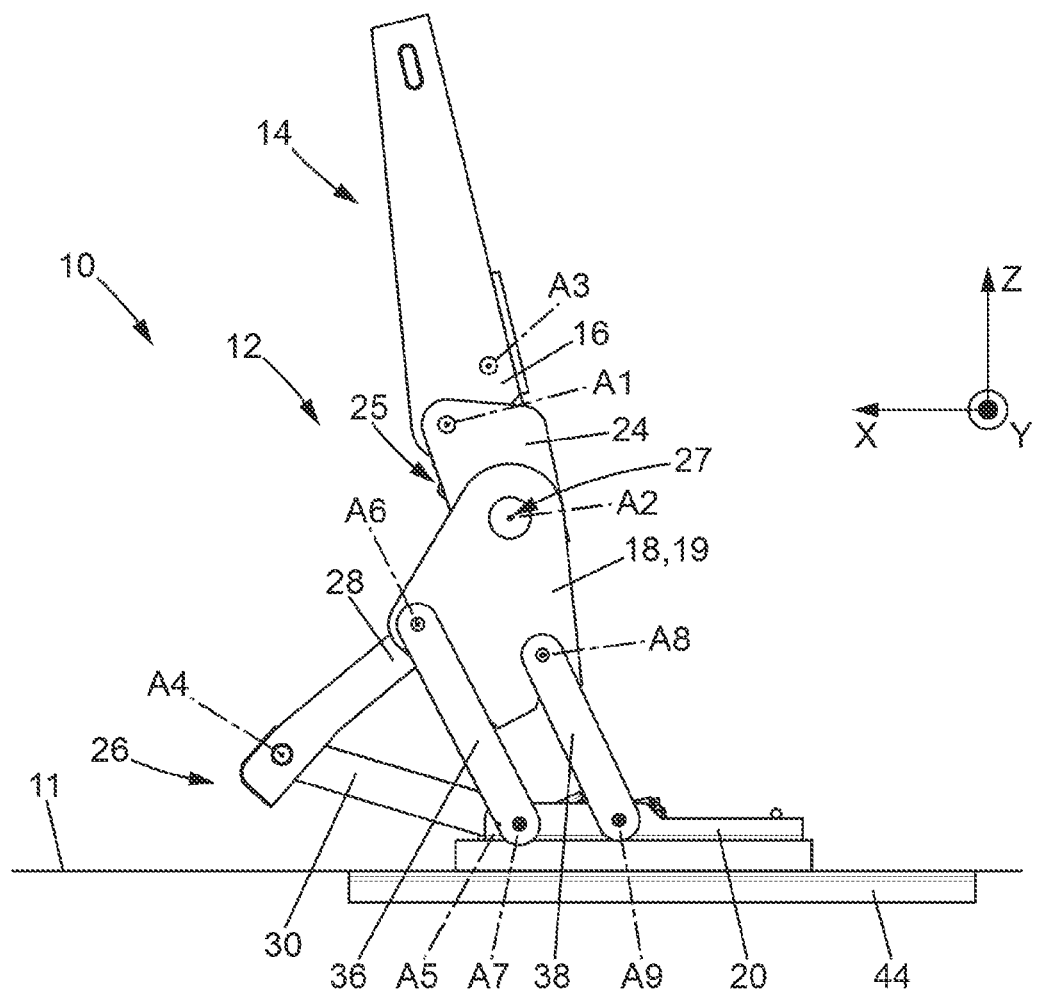
Figure 10:
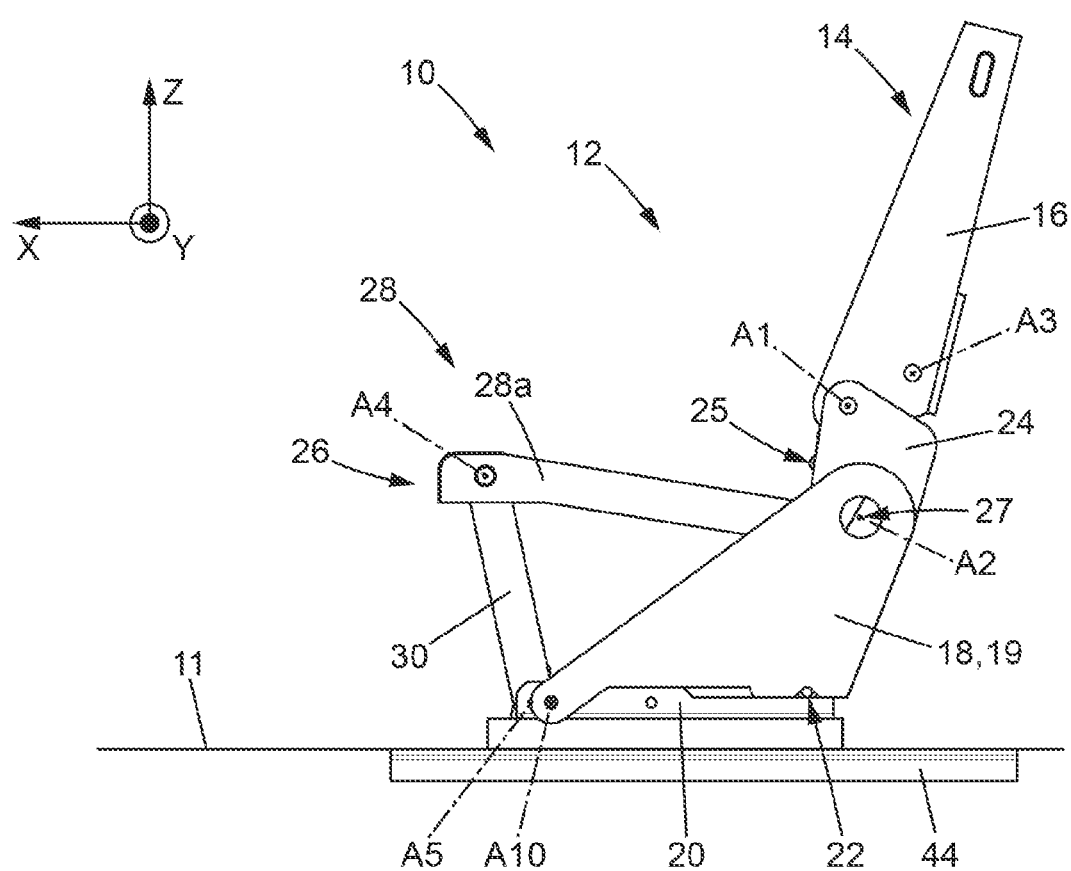
Figure 11:
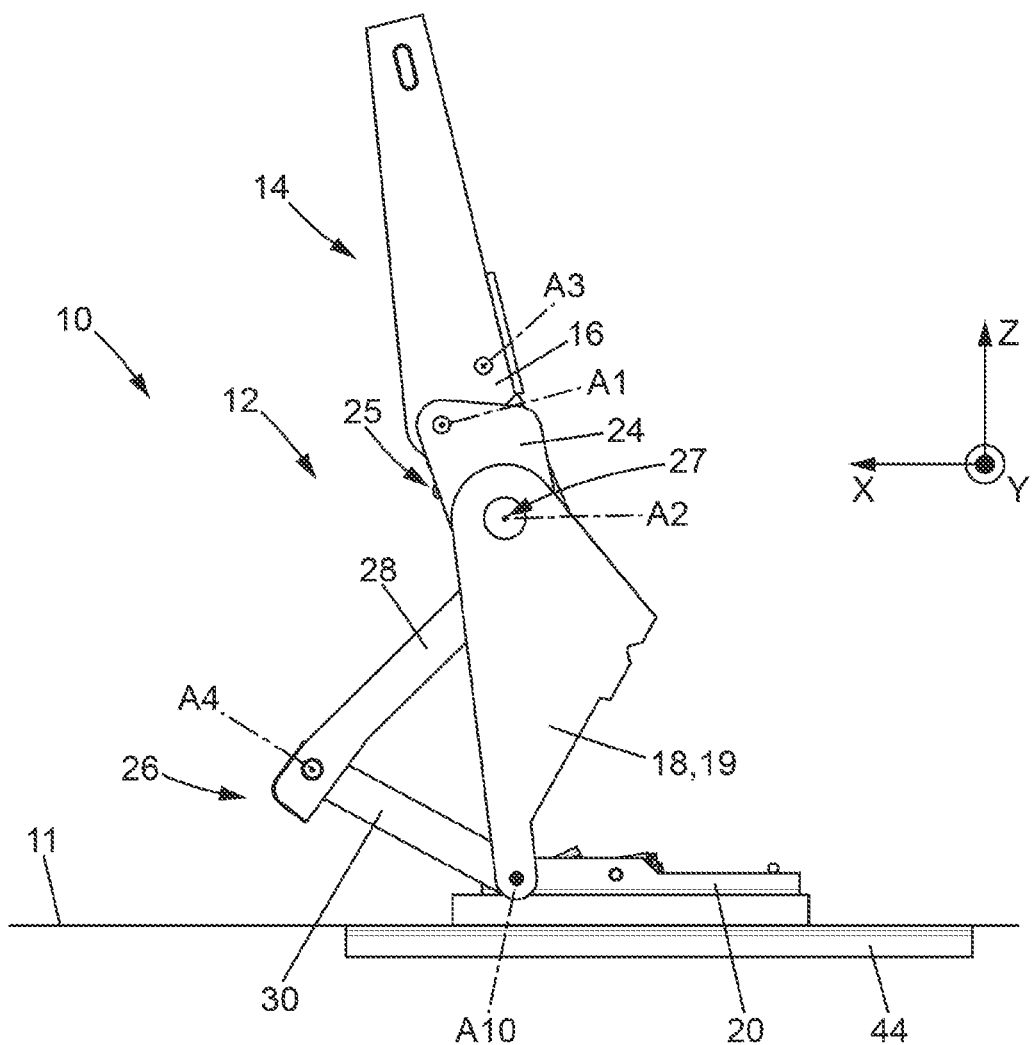

The detailed description particularly refers to the accompanying figures in which:

FIG. 1 schematically represents a perspective view of a first example of a vehicle seat assembly, the vehicle seat being in a deployed position enabling it to receive an occupant;

FIG. 2 schematically represents a perspective view of an example of a control device that can be used to selectively disengage the tilt adjustment devices of the seat of FIG. 1;

FIG. 3 schematically represents, from an opposite perspective, the example of the control device of FIG. 2;

FIG. 4 schematically represents a perspective view of the example of a vehicle seat assembly according to FIG. 1, the seat being in a first folded position enabling the seat backrest to be used as a table;

FIG. 5 schematically represents a side view of the example of a vehicle seat assembly, the seat being in the folded position of FIG. 4;

FIG. 6 schematically represents a perspective view of the example of a vehicle seat assembly according to FIG. 1, the seat being in a second folded position referred to as "flat floor";

FIG. 7 schematically represents a side view of the example of a vehicle seat assembly of FIG. 1, the seat being in the "flat floor" folded position of FIG. 6;

FIG. 8 schematically represents a perspective view of the example of a vehicle seat assembly of FIG. 1, the seat being in a position referred to as "easy entry", enabling access to seats located behind the illustrated seat;

FIG. 9 schematically represents a side view of the example of a vehicle seat assembly of FIG. 1, with the seat in the "easy entry" position of FIG. 8;

FIG. 10 schematically represents a side view of a second example of a vehicle seat assembly, the vehicle seat being in a deployed position enabling it to receive an occupant; and FIG. 11 schematically represents a side view of the second example of a vehicle seat assembly of FIG. 10, with the seat in an easy entry position.

DETAILED DESCRIPTION

In the various figures, the same references designate identical or similar elements. For conciseness, only those elements useful to understanding the embodiment described are shown in the figures and described in detail below.

In the description that follows, when referring to absolute position qualifiers such as the terms "front", "rear", "top", "bottom", "left", "right", etc., or relative qualifiers such as the terms "above", "below", "upper", "lower", etc., or to orientation qualifiers such as "horizontal", "vertical", etc., these are in reference, unless otherwise specified, to the orientation of the figures or of a seat in its normal position of use.

In the following, the longitudinal direction X means the longitudinal direction of the seat. The longitudinal direction of the seat is considered to be the same as the longitudinal direction of the motor vehicle in which the seat is mounted. This longitudinal direction X corresponds to the normal direction of travel of the vehicle. The longitudinal direction X is horizontal. The transverse direction Y is the transverse direction of the seat. The transverse direction of the seat thus corresponds to the transverse or lateral direction of the motor vehicle. This transverse direction corresponds to a direction perpendicular to the normal direction of travel of the vehicle. The transverse direction Y is also horizontal. Finally, the vertical direction Z is a vertical direction of the seat, perpendicular to the longitudinal and transverse directions.

FIG. 1 schematically represents a motor vehicle seat assembly 10 comprising a motor vehicle seat 12 mounted on a slide mechanism 13 which makes it possible to fix the vehicle seat 12 to the floor 11 of a motor vehicle. The floor 11 is for example formed by the chassis of the motor vehicle. The motor vehicle seat 12 is advantageously a rear seat. In this FIG. 1, the seat 12 is in what is called a deployed position, allowing it to receive an occupant of the seat 12.

The seat 12 firstly comprises a backrest 14, with a backrest frame 16. The seat also comprises an underframe 18. Here the underframe 18 is in the form of two plates 19, each arranged on a lateral side of the seat 12. Each plate 19 of the underframe 18 here is fixed to a respective movable rail 20 of the slide mechanism 13. The two movable rails 20 thus form a support for the vehicle seat 12. A lock 22 (partially visible in FIG. 9) here allows locking each plate 19 of the underframe 18 on the associated movable rail 20. The underframe 18 is at the back of the seat 12.

The seat 12 also comprises two flanges 24 arranged one on either side of the seat 12. Each flange 24 is fixed to the underframe 18, in particular to a respective plate of the underframe 18, and to the backrest frame 16. More specifically, each flange 24 is first of all mounted so as to pivot relative to the backrest frame 16 about a first transverse axis A1. Each flange 24 is also mounted so as to pivot relative to the underframe 18 about a second transverse axis A2.

For example, a first tilt adjustment device 25, for adjusting the tilt of the backrest frame 16 relative to the flanges 24 about the first transverse axis A1, is a device for locking the angular position of the backrest frame 16 relative to the flanges 24. The first tilt adjustment device 25 is for example a device which allows locking the backrest frame 16 in a single angular position about the first transverse axis A1, relative to the flanges 24. In a disengaged position of the first tilt adjustment device 25, the backrest frame 16 is free to pivot about the first transverse axis A1 relative to the flanges 24. The backrest frame 16 then tends to fold down into a substantially horizontal position. The first tilt adjustment device 25 for adjusting the tilt of the backrest frame 16 may then comprise a lock which, when locked, prevents rotation of the backrest frame 16 about the first transverse axis A1, and which, when unlocked, allows the backrest frame 16 to rotate freely about the first transverse axis A1.

A second tilt adjustment device 27 for adjusting the tilt of the flanges 24 relative to the underframe 18 can then allow, for example, adjusting the tilt of the flanges 24 relative to the underframe 18, into several positions. The second tilt adjustment device 27 may be continuous or discontinuous. In the first case, the second tilt adjustment device 27 allows adjusting the tilt of the flanges 24, relative to the underframe 18, into any position between two extreme positions. In the second case, the second tilt adjustment device 27 allows adjusting the tilt of the flanges 24, relative to the underframe 18, in a finite number of discrete positions between two extreme positions. However, in both cases, the second tilt adjustment device 27 preferably has a disengaged position, in which the flanges 24 can pivot freely relative to the underframe 18 about the second transverse axis A2. The second tilt adjustment device 27 can thus advantageously have a "disengaged" mode for folding down the backrest frame 16 and the flanges 24, as opposed to a "engaged" mode in which the second tilt adjustment device 27 allows adjusting the tilt of the backrest frame 16 and flanges 24 relative to the underframe 18. Preferably, the second tilt adjustment device 27 is electrically controlled. Thus, adjusting the tilt of the backrest frame 16 and flanges 24 relative to the underframe 18 is carried out by means of control buttons of the second tilt adjustment device 27. To do this, the second tilt adjustment mechanism 27 may for example comprise a drive motor. The drive motor can then be controlled by means of the control buttons. Alternatively, the second tilt adjustment device 27 may in particular be a system of the "cam-hook" type, comprising a cam and having a range of angular adjustment in which the hinge mechanism is not immobilized, corresponding to the disengaged position, and another range of adjustment, distinct from the first, in which the second adjustment device 27 can be immobilized, corresponding to the engaged position. For example, the second tilt adjustment device 27 should be unlocked or even disengaged in order to be able to adjust the angular position of the backrest frame 16 and flanges 24 relative to the underframe, the adjustment being carried out while keeping the second tilt adjustment device 27 unlocked or even disengaged. Then, once the satisfactory angular position has been reached, the second tilt adjustment device 27 is locked or even engaged once again.

The vehicle seat further comprises a seat base 26 with a seat base frame 28. The seat base frame 28 here has an "L" shape. Thus, the seat base frame 28 has a first portion 28*a* that is substantially horizontal or even slightly inclined towards the rear of the seat 12, in the deployed position of the seat 12, illustrated in FIG. 1. The seat base frame 28 also includes a second portion 28*b*. The second portion 28*b* extends in a direction comprising an upwardly oriented vertical component, in the deployed position of the seat 12.

The seat base frame 28 here is mounted so as to pivot relative to the backrest frame 16 about a third transverse axis A3. The seat base frame 28 here is free to pivot relative to the backrest frame 16, about the third transverse axis A3. Here, the third transverse axis A3 is near the free end of the second portion 28*b* of the seat base frame 28.

Furthermore, the seat base frame 28 is also connected to the movable rails 20 of the slide mechanism 13, forming the support for the seat 12, by means of identical first connecting rods 30. A first connecting rod 30 here is arranged on each lateral side of the vehicle seat 12. Here, each first connecting rod 30 is mounted so as to pivot about a fourth transverse axis A4 relative to the seat base frame 28. Here, the fourth transverse axis A4 is near the end of the first portion 28*a* of the seat base frame 28, opposite to the second portion 28*b*. The fourth transverse axis A4 is near a first end of the first connecting rods 30. Each first connecting rod 30 here is free to rotate relative to the seat base frame 28, about the fourth transverse axis A4.

Each first connecting rod 30 is also mounted so as to pivot about a fifth transverse axis A5 relative to a respective movable rail 20. The fifth transverse axis A5 here is near a second end of the first connecting rods 30, opposite to the first end.

Here, the two first connecting rods 30 are connected by a first crosspiece 32. The first connecting rods are thus integral, in particular in rotation about the fourth and fifth transverse axes A4, A5.

In addition, an actuator 34 is provided here, for controlling the rotation of the first connecting rods 30 about the fifth transverse axis A5. The actuator 34 here takes the form of an electric gear motor meshing a toothed wheel integral to one of the first connecting rods 30. Alternatively, an actuator 34 may be associated with each first connecting rod 30, the actuators 34 then being controlled in a synchronized manner.

Finally, each plate 19 of the underframe 18 is connected to a respective movable rail 20 of the slide mechanism 13, by means of second and third connecting rods 36, 38. Each second connecting rod 36 is arranged longitudinally behind a respective first connecting rod 30. Each third connecting rod 38 is arranged longitudinally behind a respective second connecting rod 36.

Each second connecting rod 36 is mounted so as to rotate freely relative to the underframe 18 about a sixth transverse axis A6. The sixth transverse axis A6 is near a first end of each of the second connecting rods 36. In addition, each second connecting rod 36 is mounted so as to rotate freely relative to the movable rail 20 about a seventh transverse axis A7. The seventh transverse axis A7 is near a second end of each of the second connecting rods 36, opposite to the first end. The second connecting rods 36 here are connected together by means of a second crosspiece 40. The second connecting rods 36 are thus integral, in particular in rotation about the sixth and seventh transverse axes A6, A7.

Similarly, each third connecting rod 38 is mounted so as to rotate freely relative to the underframe 18 about an eighth transverse axis A8. The eighth transverse axis A8 is near a first end of each of the third connecting rods 38. In addition, each third connecting rod 38 is mounted so as to rotate freely relative to a respective movable rail 20 about a ninth transverse axis A9. The ninth transverse axis A9 is near a second end of each of the third connecting rods 38, opposite to the first end. Here, the third connecting rods 38 are not connected together by means of a third crosspiece. This makes it possible to reduce the space occupied under the seat base 26 of the seat 12.

Note here that the distance between the sixth and seventh transverse axes A6, A7 is greater than the distance between the eighth and ninth transverse axes A8, A9. Consequently, in the example illustrated, the second connecting rods 36 are longer than the third connecting rods 38. Furthermore, the sixth transverse axis A6 is arranged longitudinally closer to the front of the seat 12 than the eighth transverse axis A8. In addition, the sixth transverse axis A6 is arranged vertically above the eighth transverse axis A8. Furthermore, the seventh transverse axis A7 is arranged closer to the front of the seat than the ninth transverse axis A9. The seventh transverse axis A7 here is near the fifth transverse axis A5. The seventh A7 and ninth A9 transverse axes are substantially at the same height in the vertical direction Z.

All transverse axes A1-A9 are parallel here.

The seat 12 may also comprises a headrest. The headrest is for example fixed to the backrest frame 16. Preferably, the headrest is movable relative to the backrest frame 16, in particular in a substantially vertical direction.

Advantageously, the slide mechanism 13 may be motorized. In this case, the slide mechanism comprises an actuator making it possible to move the movable rails 20 relative to the fixed rails 44 of the slide mechanism 13. The actuator of the slide mechanism 13 may be separate from actuator 34, making it possible to control the rotation of the first connecting rods 30 about the fifth transverse axis A5. Preferably, the slide mechanism 13 also includes a disengaged position, allowing free movement of the movable rails 20 relative to the fixed rails 44.

Finally, the seat 12 may be equipped with a single control device 46, for selectively controlling the disengagement of one among the first tilt adjustment device 25 and second tilt adjustment device 27.

FIG. 2 and FIG. 3 illustrate an example of such a control device 46. The control device 46 comprises a first drive cable 48. The first drive cable 48 is mounted so as to move between a first locking position and a first unlocking position. In the first locking position, the first drive cable 48 blocks the pivoting of the backrest frame 16 relative to the flanges 24. In the first unlocking position, the first drive cable 48 allows a pivoting of the backrest frame 16 relative to the flanges 24. In other words, in the first unlocking position, the first drive cable 48 controls a disengaging of the first tilt adjustment device 25.

The control device 46 further has a second drive cable 50, mounted so as to move between a second locking position and a second unlocking position. In the second locking position, the second drive cable 50 blocks a pivoting of the flanges 24 relative to the underframe 18. In the second unlocking position, the second drive cable 50 allows the pivoting of the flanges 24 relative to the underframe 18. In other words, in the second unlocking position, the second drive cable 50 controls a disengaging of the second tilt adjustment device 27.

As shown in FIG. 2 and FIG. 3, the first and second drive cables 48, 50 are controlled into the locking and/or unlocking positions, and more specifically into the unlocking positions, by an actuation device 52. The actuation device 52 may be controlled by an occupant of the seat 12, for example via one or more control member(s). Alternatively, however, the actuation device 52 may be controlled by an electronic control unit. The actuation device 52 comprises an actuator 54 and a transmission assembly 56 comprising a transmission member 58. The transmission member 58 is rotatable about a central transmission axis A in a first direction of rotation W1 and in a second direction of rotation W2 that is opposite to the first direction of rotation W1. The actuator 54 allows moving the transmission member 58. As shown, when the transmission member 58 moves in the first direction of rotation W1, it drives the first drive cable 48 from the first locking position to the first unlocking position. When the transmission member 58 moves in the second direction of rotation W2, it drives the second drive cable 50 from the second locking position to the second unlocking position. The transmission member 58 may be a rocker part driven by the actuator into one position or the other (one side or the other) depending on which drive cable 48, 50 one wishes to move. The transmission member 58 may have the general shape of a disk (or wheel) with two opposite surfaces. For example, the transmission member 58 may have a shape that is rotationally symmetric or is substantially rotationally symmetric. The central axis of transmission A may be coincident with the axis of rotational symmetry of the transmission member 58. In particular, the transmission member 58 comprises a retaining part 60. The retaining part 60 may be provided on the first surface S1 of the transmission member 58. A function of the retaining part 60 is to cooperate with the first and second drive cables 48, 50 so as to impart a movement to the first or second drive cables 48, 50.

The first drive cable 48 cooperates with the transmission member 58 by a direct-contact mechanical link, which transmits the movement of the transmission member 58 to the first drive cable 48 only in the direction of the direct contact, therefore only when the transmission member 58 rotates in the first direction of rotation W1. When the transmission member 58 rotates in the second direction of rotation W2, the first drive cable 58 remains in the first locking position, no force being transmitted to the first drive cable 48. For example, the first drive cable 58 is movably mounted in a first sheath 62. The first sheath 62 helps to keep the first drive cable 48 in position when the transmission member 58 rotates in the second direction of rotation W2. The first sheath 62 may be snap-fitted onto a frame of a vehicle seat, in particular onto the backrest frame 16 or onto the seat base frame 28.

The second drive cable 50 cooperates with the transmission member 58 by a direct-contact mechanical link which transmits the movement of the transmission member 58 to the second drive cable 50 only in the direction of the direct contact (therefore only when the transmission member 58 rotates in the second direction of rotation W2). When the transmission member 58 rotates in the first direction of rotation W1, the second drive cable 50 remains in the second locking position, no force being transmitted to the second drive cable 50. For example, the second drive cable 50 is movably mounted in a second sheath 64. The second sheath 64 helps keep the second drive cable 50 in position when the transmission member 58 rotates in the first direction of rotation W1. The second sheath 64 may be snap-fitted onto a frame of a vehicle seat, in particular onto the backrest frame 16 or onto the frame 28 of the seat base 26.

In the current case, the first drive cable 48 comprises a first end 66. The second drive cable 50 comprises a first end 68. The first ends 66, 68 are in particular free ends and are connected to the actuation device 52 via the transmission member 58, and more particularly via the retaining part 60.

As shown in FIG. 2 and FIG. 3, the retaining part 60 may include a first retaining portion 70 and a second retaining portion 72. The first retaining portion 70 may have a first hook with which the first end 66 of the first drive cable 48 cooperates. The second retaining portion 72 may have a second hook with which the first end 68 of the second drive cable 50 cooperates. The first ends 66, 68 of the first and second drive cables 48, 50 may each comprise a retaining pin or a bent portion which ensures retention of the drive cables 48, 50 on the transmission member 58, more particularly on the retaining part 60.

The first and second retaining portions 70, 72 are spaced apart from each other. In particular, retaining part 60 comprises a winding area 74. The winding area 74 is located between the first retaining portion 70 and second retaining portion 72. The winding area 74 is adapted so that the first drive cable 48 winds around the winding area 74 when the transmission member 58 rotates in the first direction of rotation W1. The winding around the winding area 74 exerts tensile force on an element connected to the first drive cable 48, in particular at a second end of the first drive cable 48. For example, the second end of the first drive cable 48 may be fixed to a release pin or any similar element of the first tilt adjustment device 25, so that traction exerted on the first drive cable 48 allows disengaging the angular position of the backrest frame 16 in relation to the flanges 24.

The winding area 74 is further adapted so that the second drive cable 50 winds around the winding area 74 when the transmission member 58 rotates in the second direction of rotation W2. The winding around the winding area 74 exerts tensile force on an element connected to the second drive cable 50, in particular at a second end of the second drive cable 50. For example, the second end of the second drive cable 50 is connected to a release pin or any similar element of the second tilt adjustment device 27, so that traction exerted on the second drive cable 50 allows disengaging the angular position of the flanges 24 in relation to the underframe 18.

The winding area 74 may include a groove suitable for receiving the first or second drive cable 48, 50 during their winding. This groove allows guiding the drive cables 48, 50.

The winding area 74 here has a curved surface and/or a domed shape.

An elastic return is provided to return the first drive cable 48 or second drive cable 50 to the locking position. In the current case, the first locking position and the second locking position are stable positions of the first and second drive cables 48, 50. Here, the elastic return is achieved for the two drive cables 48, 50 by means of a spring 76. The spring 76 here is arranged in a housing provided on the second surface of the transmission member 58, visible in FIG. 3. In this case, a lug is provided on the transmission member 58 for cooperating by a direct-contact mechanical link with the spring 76, here a spiral spring, at its end, so as to activate the spiral spring in one direction when the transmission member 58 rotates in a first direction and having no interaction with the spiral spring when the transmission member 58 rotates in a second direction opposite to the first. At the center of the spring, a similar configuration may be adopted.

As indicated above, the transmission member 58 is set in motion by the actuator 54. The actuator 54 may in particular comprise a motor, rotating an endless screw. The actuator 54 can then drive the transmission member 58, which has a toothed portion 80, via a gear 78. The gear 78 may in particular allow a reduction in the speed and an increase in the torque of the rotation of the transmission member 58, relative to the rotation of the motor output shaft.

As illustrated in FIG. 1, the seat 12 is in the deployed position, allowing it to receive an occupant of the seat. It should be noted here that there may be several deployed positions, corresponding, depending on the illustrated example, to several angular positions of the backrest frame 16 and flanges 24 relative to the underframe 18, which can be adjusted by means of the second tilt adjustment device 27. In a deployed position, the backrest frame 16 forms for example an angle, relative to the horizontal plane (X, Y), substantially equal to 90° or even greater than 90°. For example, the angle between the backrest frame 16 and the horizontal plane (X, Y) is greater than or equal to 80°, preferably greater than or equal to 85° and/or less than or equal to 120°, preferably less than or equal to 115°.

In this deployed position, the first connecting rods 30 are oriented in a substantially vertical direction, or even slightly inclined towards the front of the seat 12. The second and third connecting rods 36, 38 are inclined towards the rear of the seat 12, the third connecting rods 38 being oriented in a more horizontal direction than the second connecting rods 36.

Furthermore, in the deployed position, the first and second tilt adjustment devices 25, 27 are engaged, and the lock 22 is locked. The backrest and seat base frames 16, 28 are thus held in their relative position.

In addition, for safety purposes, the angular position of the first connecting rods 30 may be immobilized in its corresponding angular position, by means of any immobilization device accessible to those skilled in the art. In particular, an immobilizing latch may be provided. However, such an immobilization device appears optional.

To reach the first folded position shown in FIG. 4 and FIG. 5, one begins by disengaging the first tilt adjustment device 25. This can be done via the control device 46. The control device 46 may be controlled by an electronic control unit. Once the first tilt adjustment device 25 has been disengaged, the backrest frame 16 is free to rotate about the first transverse axis A1, relative to the flanges 24.

Where appropriate, the angular position of the first connecting rods 30 about the fifth transverse axis A5 is unlocked.

The backrest frame 16 is then rotated about the first transverse axis A1, by controlling a rotation of the first connecting rods 30 about the fifth transverse axis A5. This rotation of the first connecting rods 30 is controlled by means of the actuator 34 provided for this purpose. This rotation of the first connecting rods 30, counterclockwise in FIG. 4 and FIG. 5, makes it possible to pull on the backrest frame 16, which is mounted so as to pivot relative to the seat base frame 28 about the third transverse axis A3. A position of the seat 12 is thus reached in which the backrest frame 16 is substantially horizontal, facing the seat base frame 28.

The seat 12 can then be maintained in the first folded position, for example by locking the angular position of the first connecting rods 30 about the fifth transverse axis A5. Preferably, however, a stop limiting the pivoting of the first connecting rods 30 is sufficient to maintain the seat 12 in the configuration of FIG. 4 and FIG. 5. Alternatively, this position may be maintained by engaging or locking once again the first tilt adjustment device 25, in particular when the latter is a continuous or discontinuous hinge.

Note that the transition from the deployed position to the first folded position occurs:
- without moving the second and third connecting rods 36, 38;
- while keeping the lock 22 locked; and
- while maintaining the second tilt adjustment device 27 in its engaged position.

The seat 12 can be controlled to return from the first folded position to the deployed position, by controlling a reverse rotation of the first connecting rods 30, then a locking of the first tilt adjustment device 25.

Next we focus on the transition from the deployed position, illustrated in FIG. 1, to the second folded position, illustrated in FIG. 6 and FIG. 7, referred to as "flat floor". In this second folded position, the backrest 14 is in a lower position than in the first folded position. Similarly, the seat base 26 is lower in this second folded position than in the first folded position. Thus, in this second folded position, the space occupied by the seat 12 is reduced.

To reach this second folded position, one begins by disengaging the second tilt adjustment device 27. This may be achieved by means of the control device 46, which may be controlled by an electronic control unit. Once this second tilt adjustment device 27 has been disengaged, the assembly formed by the backrest frame 16 and the flanges 24 is free to rotate about the second transverse axis A2, relative to the underframe 18.

Where appropriate, the angular position of the first connecting rods 30 about the fifth transverse axis A5 is then unlocked.

The assembly formed by the backrest frame 16 and the flanges 24 is then pivoted about the second transverse axis A2, by controlling a rotation of the first connecting rods 30 about the fifth transverse axis A5. This rotation of the first connecting rods 30 is controlled by means of the actuator 34 provided for this purpose. This rotation of the first connecting rods 30, counterclockwise in FIG. 6 and FIG. 7, makes it possible to pull on the backrest frame 16, which is mounted so as to pivot relative to the seat base frame 28. This causes rotation of the assembly formed by the backrest frame 16 and flanges 24 about the second transverse axis A2, to a position in which the backrest frame 16 is substantially horizontal, facing the seat base frame 28. In addition, in this second folded position, the seat base 26 is lowered, here to substantially the same height in the vertical direction as the movable rails 20 of the slide mechanism 13. This is obtained by pivoting the first connecting rods 30 more significantly than in the case of the first folded position. Thus, in the second folded position illustrated in FIG. 6 and FIG. 7, the first connecting rods 30 are practically horizontal.

The seat 12 can then be maintained in the second folded position, for example by locking the angular position of the first connecting rods 30 about the fifth transverse axis A5.

Note that the transition from the deployed position to the second folded position occurs:

without moving the second and third connecting rods 36, 38;
while keeping the lock 22 locked; and
while maintaining the first tilt adjustment device 25 in its engaged position.

The seat 12 can be controlled to return from the second folded position to the deployed position, by controlling a reverse rotation of the first connecting rods 30 about the fifth transverse axis A5, then a locking of the second tilt adjustment device 27.

Finally, we focus on the transition from the deployed position to the easy entry position of FIG. 8 and FIG. 9.

To reach this easy entry position, the lock 22 is first unlocked. The underframe 18 is then detached from the movable rails 20 of the slide mechanism 13. Where appropriate, the angular position of the first connecting rods 30 about the fifth transverse axis A5 is unlocked.

A rotation of the first connecting rods 30 about the fifth transverse axis A5 is then controlled. This rotation may be controlled by the actuator 34 provided for this purpose.

Advantageously, the second and third connecting rods 36, 38 here are shaped to then lift the back of the seat 12 relative to the front of the seat 12.

The seat 12 can then be held in position by locking the angular position of the first connecting rods 30 about the fifth transverse axis A5. Alternatively, a stop restricting the pivoting of the first connecting rods 30 can allow maintaining the seat 12 in the easy entry position. In this case, in fact, the weight of the seat 12 tends to keep it in contact with the stop restricting the pivoting of the first connecting rods 30.

Advantageously, the rotation of the first connecting rods 30 about the fifth transverse axis A5 may be accompanied by a forward movement of the movable rails 30 within the fixed rails 44. This makes it possible to increase the space behind the seat 12, allowing the passage of a person.

Alternatively, the rotation of the first connecting rods 30 about the fifth transverse axis A5 may be accompanied by freeing the movable rails 30 to move within the fixed rails 44. In this case, a person wishing to sit behind the seat 12 can manually move the seat 12 relative to the fixed rails 44.

Note that the transition from the deployed position to the easy entry position is made while maintaining the angular positions of the backrest frame 16 relative to the flanges 24 about the first transverse axis A1, on the one hand, and the flanges 24 relative to the underframe 18 about the second transverse axis A2, on the other hand. This can be achieved in particular by maintaining the first and second tilt adjustment devices 25, 27 in their engaged positions.

A return to the deployed position may, here again, be controlled by pivoting the first connecting rods 30 in the opposite direction, and by relocking the lock 22. Where appropriate, a movement of the movable rails within the fixed rails may be implemented.

FIG. 10 and FIG. 11 illustrate a second example of a seat 12, devoid of second and third connecting rods 36, 38. In this second example, in fact, the underframe 18 is directly mounted so as to pivot about a tenth transverse axis A10 relative to the movable rail 20. The tenth transverse axis A10 extends near the fifth transverse axis A5, substantially at the same position as the seventh transverse axis A7 of the first example.

The seat 12 can also be folded into the table or flat floor position, by implementing the methods described above. In effect, in these methods the underframe 18 is not moved.

The seat 12 can also transition from the deployed position allowing it to receive an occupant, illustrated in FIG. 10, to an easy entry position, illustrated in FIG. 11.

To reach this easy entry position, the lock 22 is first controlled so that it is unlocked. The underframe 18 is then detached from the movable rails 20 of the slide mechanism 13. Where appropriate, the angular position of the first connecting rods 30 about the fifth transverse axis A5 is then unlocked.

A rotation of the first connecting rods 30 about the fifth transverse axis A5 is then controlled. This rotation may be controlled by the actuator 34 provided for this purpose.

Advantageously, the underframe 18 and the position of the tenth transverse axis A10 are shaped to then lift the back of the seat 12 relative to the front of the seat 12.

The seat 12 can then be held in position by locking the angular position of the first connecting rods 30 about the fifth transverse axis A5. Alternatively, a stop restricting the pivoting of the first connecting rods 30 can make it possible to maintain the seat 12 in the easy entry position. In effect, in this case the weight of the seat 12 tends to keep it in contact with the stop restricting the rotation of the first connecting rods 30 about the fifth transverse axis A5.

Advantageously, the rotation of the first connecting rods 30 about the fifth transverse axis A5 may be accompanied by a forward movement of the movable rails 30 within the fixed rails 44. This makes it possible to increase the space behind the seat 12, allowing the passage of a person.

Alternatively, the rotation of the first connecting rods 30 about the fifth transverse axis A5 may be accompanied by freeing the movable rails 30 to move within the fixed rails 44. In this case, a person wishing to sit behind the seat 12 can manually move the seat 12 relative to the fixed rails 44.

Note that one transitions from the deployed position to the easy entry position while maintaining the angular positions of the backrest frame 16 relative to the flanges 24 about the first transverse axis A1, on the one hand, and the flanges 24 relative to the underframe 18 about the second transverse axis A2, on the other hand. This may be achieved in particular by maintaining the first and second tilt adjustment devices 25, 27 in their engaged positions.

Here again, a return to the deployed position can be controlled by pivoting the first connecting rods 30 in the opposite direction, and by relocking the lock 22. Where necessary, a movement of the movable rails within the fixed rails may be implemented.

This disclosure is not limited to the example described above solely as an example, but encompasses all variants conceivable to a person skilled in the art within the framework of the protection sought.

First of all, in the illustrated example, the seat is mounted on movable rails of a slide mechanism. Alternatively, the seat may be mounted directly on the floor of the passenger compartment of the motor vehicle. Other forms of seat support are also conceivable to those skilled in the art.

Next, the vehicle seat may not comprise the second and third connecting rods, nor an underframe mounted so as to pivot relative to the support. The underframe may be integrally attached to the seat support. In particular, a lock may not be necessary in this case. Such a seat, however, does not allow reaching the easy entry position as discussed above. Advantageously, it is however possible to control the transition of such a seat from a deployed position to one among the first and second folded positions, by disengaging one of the tilt adjustment devices 25, 27 and by controlling a rotation of the first connecting rods 30 about the fifth transverse axis A5.

In the example illustrated, the first tilt adjustment device 25 makes it possible to fix the backrest frame 16 in a single angular position relative to the flanges 24. Alternatively, the first tilt adjustment device 25 may allow adjusting different angular positions of the backrest frame 16 relative to the flanges 24 about the first transverse axis A1. In this case in particular, the second tilt adjustment device 27 can then only allow fixing the flanges 24 in an angular position relative to the underframe 18. Alternatively, the two tilt adjustment devices 25, 27 allow fixing a single angular position of the backrest frame 16 relative to the flanges 24 and of the flanges 24 relative to the underframe 18, respectively. Finally, the two tilt adjustment devices 25, 27 may allow adjusting different angular positions. In particular, each among the first and second tilt adjustment devices 25, 27 may be a hinge, continuous or discontinuous.

Finally, the control device 46 described above is one example among others, accessible to those skilled in the art, of a control device 46 that can be implemented in the seat 12.

In the field of vehicles, in particular motor vehicles, seats may comprise a seat base and a backrest, the backrest being foldable relative to the seat base in order to allow using the backrest as a table. This makes it possible to increase the comfort of occupants of a vehicle, in particular the occupants of the rear seats of the vehicle.

Furthermore, the backrest may be folded down to face the seat base in a "flat floor" position, which allows increasing the size of the vehicle's trunk.

The purpose of this disclosure is to further improve the comfort of the occupants of a vehicle, in particular of a motor vehicle.

To this end, a vehicle seat is proposed, in particular a motor vehicle seat, comprising: an underframe; a backrest with a backrest frame; a flange on each side of the backrest, each flange being mounted so as to pivot relative to the backrest frame about a first transverse axis, and relative to the underframe about a second transverse axis.

Thus, advantageously, the seat backrest can be folded to two different heights. The folded backrest can thus be used in particular as a table, in a first folded position. A second folded position can correspond to what is called a "flat floor" position.

Preferably, the vehicle seat comprises one or more of the following features, alone or in combination:
the vehicle seat further comprises a seat base with a seat base frame, the seat base frame being mounted so as to pivot relative to the backrest frame about a third transverse axis, the seat base frame preferably having an "L" shape;
the vehicle seat further comprises a first connecting rod, preferably two first connecting rods arranged one on each side of the seat, in order to connect the seat base frame to a seat support, each first connecting rod being mounted so as to pivot relative to the seat base frame about a fourth transverse axis, each first connecting rod further being intended to be mounted so as to pivot relative to the seat support about a fifth transverse axis;
the vehicle seat further comprises an actuator for controlling the pivoting of each first connecting rod about the fifth transverse axis;
the vehicle seat comprises a first tilt adjustment device for adjusting the tilt of the backrest frame relative to the flanges about the first transverse axis, and a second tilt adjustment device for adjusting the tilt of the flanges relative to the underframe about the second transverse axis, at least one among the first and second tilt adjustment devices being capable of being disengaged, the first and second tilt adjustment devices preferably both being capable of being disengaged;
each among the first and second tilt adjustment devices is a continuous or discontinuous hinge, able to be disengaged;
the seat further comprises a single actuating device, suitable for selectively controlling the disengagement of one among the first and second hinges;
the vehicle seat further comprises second and preferably third connecting rods, more preferably two second and two third connecting rods, each arranged one on each side of the seat,
each second connecting rod being mounted so as to pivot relative to the underframe about a sixth transverse axis, and intended to be mounted so as to pivot relative to a seat support about a seventh transverse axis,
each third connecting rod being mounted so as to pivot relative to the underframe about an eighth transverse axis, and intended to be mounted so as to pivot relative to the seat support about a ninth transverse axis,
such that a rotation of the second and/or third connecting rods causes a rear end of the seat, in particular of the underframe, to rise relative to a front end of the seat;
the underframe is intended to be mounted so as to pivot relative to the seat support about a tenth transverse axis; and
the vehicle seat further comprises a lock intended for locking/unlocking the underframe to/from the seat support.

According to another aspect, a vehicle seat assembly is described comprising a seat support and a seat as described above, in all its combinations, fixed to the seat support, the seat support preferably being formed by one, or more preferably several, movable rails of a slide mechanism.

According to another aspect, a motor vehicle is described comprising a chassis defining a passenger compartment with a floor, and a vehicle seat assembly as described above, in all its combinations, the vehicle seat support being fixed to the floor of the passenger compartment or being formed by the floor.

According to another aspect, a method is described for folding a vehicle seat as described above, in all its combinations, in particular comprised in a seat assembly as described above, in all its combinations, or in a motor vehicle as described above, in all its combinations, from a deployed position enabling it to receive an occupant of the seat, to a first folded position, comprising the steps of:
   i) where appropriate, disengaging the first tilt adjustment device, preferably by operating the actuation device, where appropriate; and
   ii) folding down the backrest frame to face the seat base frame, by pivoting the backrest frame relative to the flanges about the first transverse axis,
   step ii) preferably being implemented by controlling the pivoting of each first connecting rod about the fifth transverse axis, where appropriate.

According to another aspect, a method is described for folding a vehicle seat as described above, in all its combinations, in particular comprised in a seat assembly as described above, in all its combinations, or in a motor vehicle as described above, in all its combinations, from a deployed position enabling it to receive an occupant of the seat, to a second folded position, comprising the steps of:
   i) where appropriate, disengaging the second tilt adjustment device, preferably by operating the actuation device, where appropriate; and
   ii) folding down the backrest frame to face the seat base frame, by pivoting the backrest frame and the flanges relative to the underframe, about the second transverse axis,
   step ii) preferably being implemented by controlling the pivoting of each first connecting rod about the fifth transverse axis, where appropriate.

According to another aspect, a method is described for transitioning a vehicle seat as described above, in all its combinations, in particular comprised in a seat assembly as described above, in all its combinations, or a motor vehicle as described above, in all its combinations, from a deployed position enabling it to receive an occupant of the seat, to an easy entry position facilitating access to seating located behind the seat, the method comprising the steps of:
   i) where appropriate, unlocking the lock; and
   (ii) raising the rear of the seat relative to the front of the seat,
   step ii) preferably being implemented by controlling the pivoting of each first connecting rod about the fifth transverse axis, where appropriate.

A vehicle seat (12) comprises an underframe (18); a backrest (14) with a backrest frame (16); and a flange (24) on each side of the backrest (14). Each flange (24) is mounted so as to pivot relative to the backrest frame (16) about a first transverse axis (A1), and relative to the underframe (18) about a second transverse axis (A2).

The invention claimed is:

1. A vehicle seat comprising:
   an underframe;
   a backrest with a backrest frame; and
   a flange, on each side of the backrest,
   wherein each flange being mounted so as to pivot relative to the backrest frame about a first transverse axis, and relative to the underframe about a second transverse axis,
   the vehicle seat further comprising a seat base with a seat base frame, the seat base frame being attached to the backrest frame so as to pivot relative to the backrest frame about a third transverse axis.

2. The vehicle seat of claim 1, wherein the seat base frame has an "L" shape.

3. The vehicle seat of claim 1, further comprising a first connecting rod, in order to connect the seat base frame to a seat support, the first connecting rod being mounted so as to pivot relative to the seat base frame about a fourth transverse axis, the first connecting rod further being intended to be mounted so as to pivot relative to the seat support about a fifth transverse axis.

4. The vehicle seat of claim 1, further comprising two first connecting rods arranged one on each side of the seat, in order to connect the seat base frame to a seat support, each first connecting rod being mounted so as to pivot relative to the seat base frame about a fourth transverse axis, each first connecting rod further being intended to be mounted so as to pivot relative to the seat support about a fifth transverse axis.

5. The vehicle seat of claim 3, further comprising an actuator for controlling the pivoting of the first connecting rod about the fifth transverse axis.

6. The vehicle seat of claim 1, comprising a first tilt adjustment device for adjusting the tilt of the backrest frame relative to the flanges about the first transverse axis, and a second tilt adjustment device for adjusting the tilt of the flanges relative to the underframe about the second transverse axis, at least one among the first and the second tilt adjustment devices being capable of being disengaged.

7. The vehicle seat of claim 6, wherein the first and second tilt adjustment devices are both capable of being disengaged.

8. The vehicle seat of claim 6, wherein each among the first and second tilt adjustment devices is one among a continuous and discontinuous hinge, able to be disengaged.

9. The vehicle seat of claim 8, further comprising a single actuating device, suitable for selectively controlling the disengagement of one among the first and second hinges.

10. The vehicle seat of claim 1, further comprising a second connecting rod, the second connecting rod being mounted so as to pivot relative to the underframe about a sixth transverse axis, and intended to be mounted so as to pivot relative to a seat support about a seventh transverse axis, such that a rotation of the second connecting rod causes a rear end of the seat, to rise relative to a front end of the seat.

11. The vehicle seat of claim 10, further comprising a third connecting rod, the third connecting rod being mounted so as to pivot relative to the underframe about an eighth transverse axis, and intended to be mounted so as to pivot relative to the seat support about a ninth transverse axis, such that a rotation of the second and third connecting rods causes a rear end of the seat, to rise relative to a front end of the seat.

12. The vehicle seat of claim 1, wherein the underframe is intended to be mounted so as to pivot relative to the seat support about a tenth transverse axis.

13. The vehicle seat of claim 10, further comprising a lock intended for locking/unlocking the underframe to/from the seat support.

14. The vehicle seat of claim 12, further comprising a lock intended for locking/unlocking the underframe to/from the seat support.

15. A vehicle seat assembly, comprising a seat support and the vehicle seat according to claim 1 fixed to the seat support.

16. A motor vehicle comprising a chassis defining a passenger compartment with a floor, and the vehicle seat assembly according to claim 15, the support of the vehicle seat being fixed to the floor of the passenger compartment or being formed by the floor.

17. A method for folding the vehicle seat according to claim 1, from a deployed position enabling it to receive an occupant of the seat, to a first folded position, comprising the step of:

folding down the backrest frame to face the seat base frame, by pivoting the backrest frame relative to the flanges about the first transverse axis.

18. A method for folding the vehicle seat according to claim 1, from a deployed position enabling it to receive an occupant of the seat, to a second folded position, comprising the step of:

folding down the backrest frame to face the seat base frame, by pivoting the backrest frame and the flanges relative to the underframe, about the second transverse axis.

19. A method for transitioning the vehicle seat according to claim 10, from a deployed position enabling it to receive an occupant of the seat, to an easy entry position facilitating access to seating located behind the seat, the method comprising the step of:

raising the rear of the seat relative to the front of the seat.

20. A method for transitioning the vehicle seat according to claim 12, from a deployed position enabling it to receive an occupant of the seat, to an easy entry position facilitating access to seating located behind the seat, the method comprising the step of: raising the rear of the seat relative to the front of the seat.

\* \* \* \* \*